(12) United States Patent
Sega et al.

(10) Patent No.: US 9,166,710 B2
(45) Date of Patent: Oct. 20, 2015

(54) POWER DISPLAY FOR COMMUNICATION SIGNAL AND SIGNAL ANALYZER

(75) Inventors: Koichi Sega, Saitama (JP); Katsushi Ogata, Tokyo (JP)

(73) Assignee: TEKTRONIX INTERNATIONAL SALES GMBH, Rheinfall (CH)

(*) Notice: Subject to any disclaimer, the term of this patent is extended or adjusted under 35 U.S.C. 154(b) by 505 days.

(21) Appl. No.: 12/302,746

(22) PCT Filed: May 29, 2007

(86) PCT No.: PCT/IB2007/004225
§ 371 (c)(1),
(2), (4) Date: Oct. 12, 2009

(87) PCT Pub. No.: WO2008/035232
PCT Pub. Date: Mar. 27, 2008

(65) Prior Publication Data
US 2010/0034105 A1     Feb. 11, 2010

(30) Foreign Application Priority Data
May 26, 2006   (JP) .................................. 2006-147485

(51) Int. Cl.
*G01R 31/08*   (2006.01)
*H04B 17/327*  (2015.01)
*H04B 17/23*   (2015.01)

(52) U.S. Cl.
CPC .............. *H04B 17/327* (2015.01); *H04B 17/23* (2015.01)

(58) Field of Classification Search
CPC ...... H04W 24/00; H04W 80/04; H04W 84/12
USPC .................. 370/252, 328, 335, 338, 465, 401
See application file for complete search history.

(56) References Cited

U.S. PATENT DOCUMENTS

| | | | |
|---|---|---|---|
| 6,266,527 B1* | 7/2001 | Mintz | 455/423 |
| 6,519,227 B1* | 2/2003 | Koizumi | 370/241 |
| 7,379,851 B2* | 5/2008 | Koizumi et al. | 702/189 |
| 7,675,880 B2* | 3/2010 | Kim | 370/318 |
| 2003/0064730 A1* | 4/2003 | Chen et al. | 455/453 |
| 2003/0072281 A1* | 4/2003 | Hirata | 370/335 |
| 2004/0116144 A1* | 6/2004 | Shapira | 455/522 |

FOREIGN PATENT DOCUMENTS

| | | | |
|---|---|---|---|
| DE | 10056258 A1 | 5/2002 | |
| EP | 1304822 A1 | 4/2003 | |

\* cited by examiner

Primary Examiner — Ricky Ngo
Assistant Examiner — Christine Ng
(74) Attorney, Agent, or Firm — Marger Johnson

(57) ABSTRACT

In order to easily understand the relationship between communication signals of a plurality of channels, a signal analyzer provides a display showing a stacked bar graph 100 that stacks powers of the plurality of channels in every time slot with the horizontal axis representing time. A marker 110 is displayed on the graph 100 and parameter information in the time slot corresponding to the display position of the marker 110 is also displayed in a table 112. If the display position of the marker 110 may change and the parameter information for the time slot is not displayed in the table 112, the display range of the parameters in the table 112 is changed in synchronism with the displayed marker position. Additionally, power related information of each channel in the time slot corresponding to the display position of the marker 110 may also be displayed in a display column 118.

6 Claims, 6 Drawing Sheets

POWER DISPLAY FOR COMMUNICATION SIGNAL AND SIGNAL ANALYZER

BACKGROUND

Embodiments of the present invention relate generally to a display for measuring communication signal conditions and a signal analyzer, more specifically to a display for enabling one to easily measure power changes in time between a plurality of channels of multiplexed communication signals and a signal analyzer having such display.

Communication signals to be used in the W-CDMA type cellular phone system, or the like, are transmitted and received by multiplexing signals of a plurality of channels by a single carrier. A known signal analyzer for observing and measuring conditions of such communication signals is, for example, a wireless communication analyzer model WCA 200A commercially available from Tektronix, Inc. in the United States of America. This wireless communication analyzer comprises a spectrum analyzer based hardware in combination with a general purpose basic software operating system (OS) developed for personal computers and a plurality of application software that operate simultaneously in a plurality of windows. The installed application software allows the user to realize various functions that are suited for signal analysis of communication signals. FIG. 1 illustrates an exemplified graph that is available from a conventional signal analyzer using such application software. The upper half in FIG. 1 is a code domain power display, while the lower half is a codegram display.

A code domain display is disclosed in, for example, the specification of U.S. Pat. No. 6,219,340. Each bar in a code domain display represents an active channel and its width changes in response to the code layer on which the channel is located. For example, if the channel is on the code layer 2, eight (8) code channels are used. On the other hand, if the channel is on the code layer 3, sixteen (16) code channels are used. Accordingly, any channel on the code layer 3 is displayed with a double width of the channel on the code layer 2. The height of each bar represents power in dB.

A codegram display is disclosed in the specification of US patent publication no. 2004/0032897. The codegram display is considered to include all information of the code domain power display in addition to time changing information. The horizontal axis represents time. Similar to the code domain power display, each bar represents a channel and its width varies in response to the code layer on which the channel is located. Power is displayed in different colors.

Markers 6 and 8 are used respectively in the code domain power display and the codegram display for numerically displaying the corresponding channel name and power. Additionally, time information is also displayed in the codegram display. Such displays provide various information such as, for example, channels that are active, the code layer that an active channel is on, whether the code layer is active, and the power level of the channel.

As apparent from the foregoing descriptions, the code domain power display and the codegram display are able to provide power level condition for each of a plurality of channels and how they change in time. Unfortunately, however, it was hard to understand the relationship between communication signals of a plurality of channels. Specifically, it was hard to recognize how each channel uses power with respect to the total power of the communication signal and how they change in time among a plurality of channels.

SUMMARY

Accordingly, a display and a signal analyzer that enable the user to easily understand the relationship of the communication signals of a plurality of channels together with their timing factors is provided. Embodiments of the present invention provide such displays and signal analyzers, thereby overcoming the drawback of the prior art.

Embodiment of the present invention relate to a power display of communication signals for displaying time changing powers of a plurality of channels of communication signals in which a plurality of channels are multiplexed by a single carrier. In embodiments of the present invention, a graph representing the total power of the communication signals is displayed by stacking powers of a plurality of channels in every predetermined time interval. This can be achieved by installing application software for performing the functions of the present invention into an existing signal analyzer such as the model WCA200A or the like. The predetermined time interval is known as the time slot in, for example, the W-CDMA communication system or the like.

It is possible to display a marker on the graph and also a table representing parameter conditions of the communication signals in every predetermined time interval. In this case, the display range of the parameters in the table is changed in synchronism with the marker display position so that the parameter conditions of the communication signals for the predetermined time interval corresponding to the marker display position are displayed in the table regardless of any change in the marker display position.

Moreover, it is possible to display a marker on the graph along with numerical values of power information for a plurality of channels for the predetermined time interval corresponding to the marker display position. The power information may be, for example, in dBm or a power ratio of each channel relative to the total power (in percentage or dB).

In another aspect, an embodiment the present invention is a signal analyzer comprising the following constituting elements. Storage means comprising a RAM (Random Access Memory), an HDD (Hard disc Drive) or the like stores digital data representing the communication signals in which a plurality of channels are multiplexed by a single carrier. Calculation means for calculating powers of a plurality of channels multiplexed in the communication signals from the digital data. Display means displays a graph representing the total power of the communication signals by stacking powers of the plurality of channels in a predetermined time interval.

Further embodiments of the present invention exhibit further advantages. That is, these embodiments enable one to easily understand the relationship among a plurality of channels in the communication signals. Accordingly, embodiments are useful for such applications as optimizing power distribution between a plurality of channels, or the like. For example, when the maximum transmission power is regulated by specification and when encountering a phenomenon that the total power exceeds the maximum value, measurements using an embodiment of the present invention enable one to easily cope with such problem by decreasing the power of a certain less influential channel.

The invention will now be described, by way of example, with reference to the accompanying drawings.

BRIEF DESCRIPTION OF THE FIGURES

In the Figures, like reference numbers denote like parts or processes.

DETAILED DESCRIPTION

Figure 1:
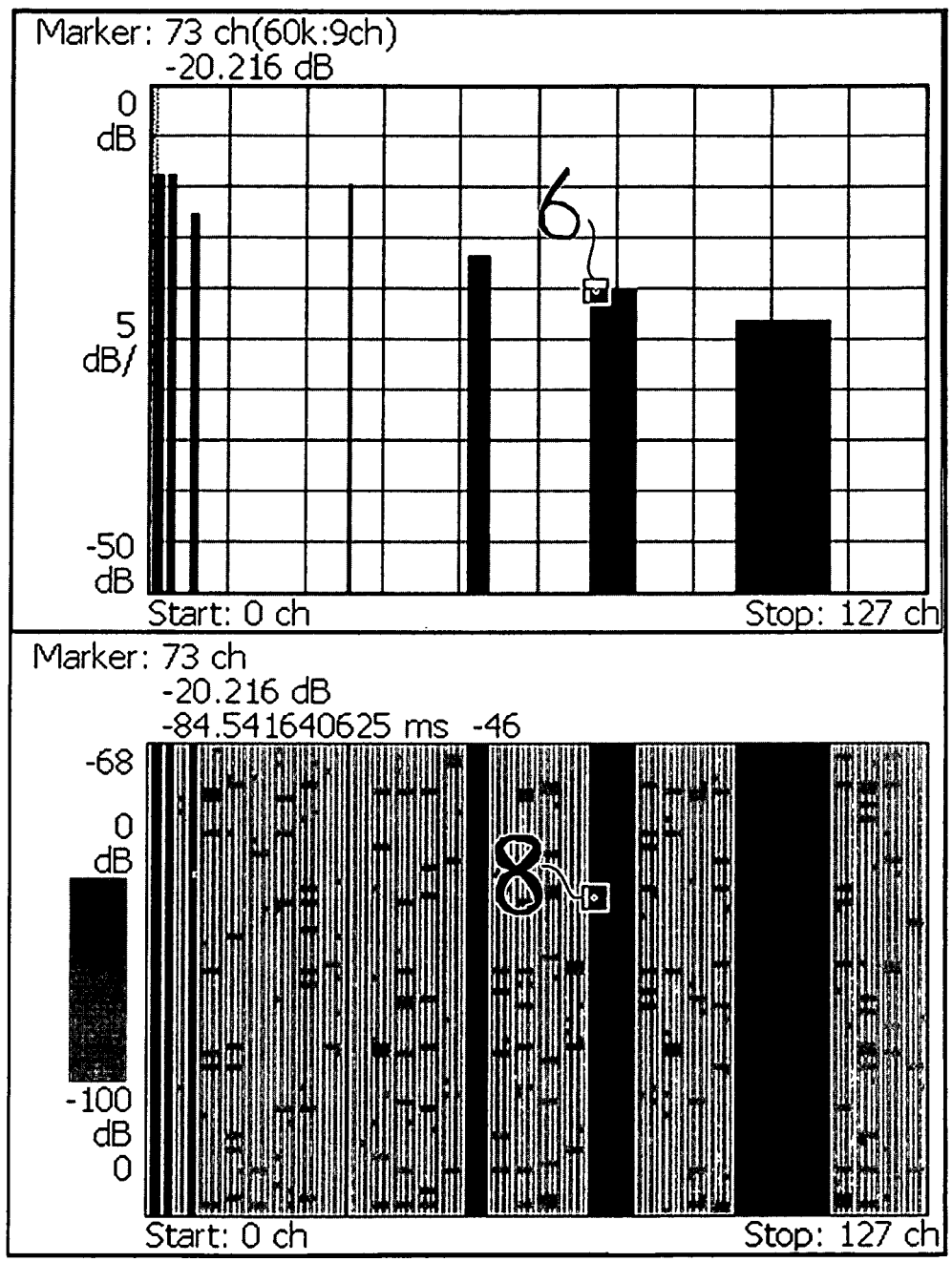
FIG. 1 is exemplified conventional graphic displays for measuring communication signals.
Figure 2:
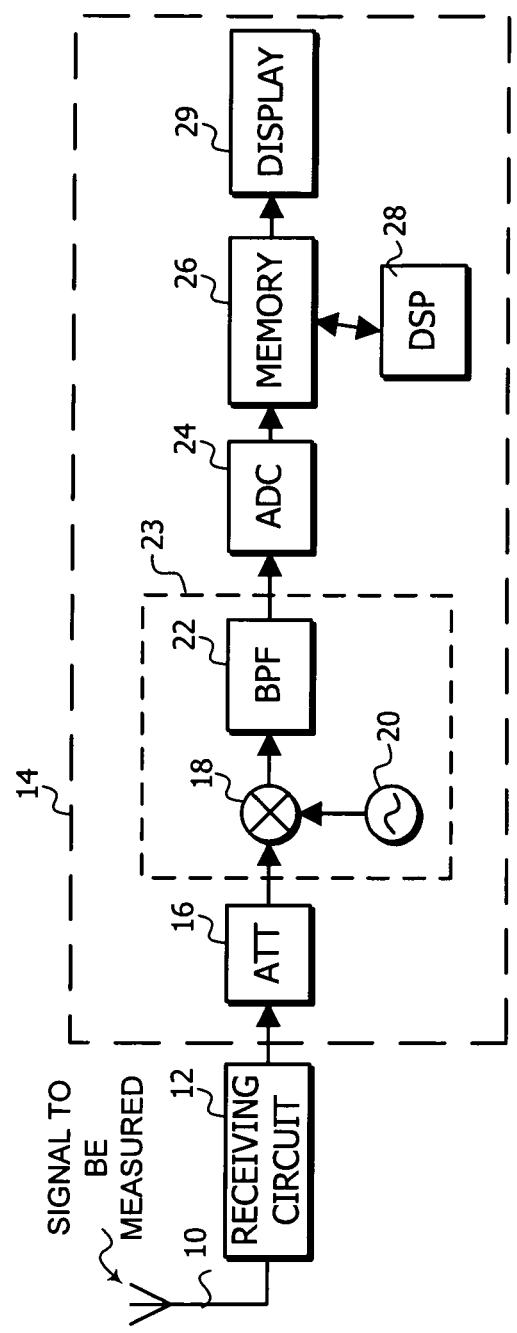
FIG. 2 is a functional block diagram of a wireless signal analysis system using a signal analyzer according to the present invention.

Now, embodiments of the present invention will be described in greater detail with reference to the accompanying drawings. FIG. 2 is a functional block diagram of a wireless signal analysis system using a signal analyzer according to the present invention. In order to implement the present invention, it is possible to use hardware of an existing signal analyzer. The signal analyzer 14 has functions and hardware similar, or equivalent, to those of a personal computer. Although not shown, a personal computer employing a general purpose CPU is capable of storing a large quantity of data using a hard disc drive (HDD) and various settings by graphical user interface using a keyboard and a mouse. The present invention can be realized by installing application software for achieving the functions in an existing signal analyzer.

Figure 3:
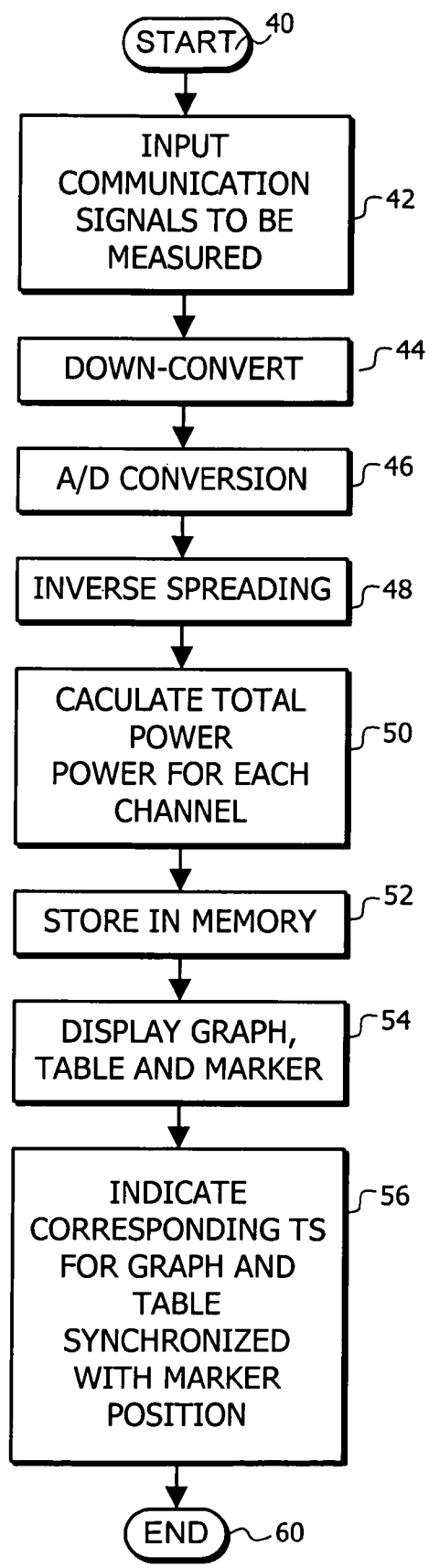
FIG. 3 is a flowchart to show an exemplified data processing of the display according to the present invention.

FIG. 3 is a flowchart to illustrate an exemplified processing to realize the display according to an embodiment of the present invention. An example of data processing according to the present invention will be described hereunder with reference to FIGS. 2 and 3. A receiver circuit 12 converts a signal to be measured or a communication signal (a wireless signal in this particular example) received by an antenna 10 into an electrical signal and supplies the converted electrical signal to a preamplifier circuit (ATT) 16 through an input terminal of the signal analyzer 14. The preamplifier circuit 16 adjusts the input signal to suitable amplitude before being supplied to a down-converter 23 (step 42). The down-converter 23 comprises a mixer 18, a local oscillator 20 and a band pass filter 22 and converts the frequency of the input signal into an intermediate frequency (IF) signal (or down-convert) in an analog manner (step 44). Although only a single stage of the down-converter 23 is shown in FIG. 2, it is of course possible to provide two or three stages of down-converters if necessary. The IF signal is converted into digital data (time-domain data) by an analog-to-digital converter 23 (step 46).

A DSP (Digital Signal Processor) 28 performs inverse-spreading based on a different spreading factor for each channel in order to obtain symbol data (step 48). A total power and a power to be used for transmitting each channel are calculated from the symbol data (step 50). Such data are then stored in an HDD (step 52) to be used in a graph, a table and a marker display that will be described hereinafter (step 54). Moreover, in an embodiment of the present invention, the marker display position on the graph and the table are related to each other and conditions of parameters for the time slot (TS) that correspond to the marker display position on the graph are displayed in the table on the display screen of a display device 29 (step 56). If the marker is displayed at the time slot that is not currently displayed in the table, the display range of the table is changed so that the corresponding time slot is included in the table. It is to be noted that the data to be used in the table are not necessarily acquired by receiving the wireless signal each time. Instead, any data that are generated in advance may be copied in the signal analyzer.

Figure 4:
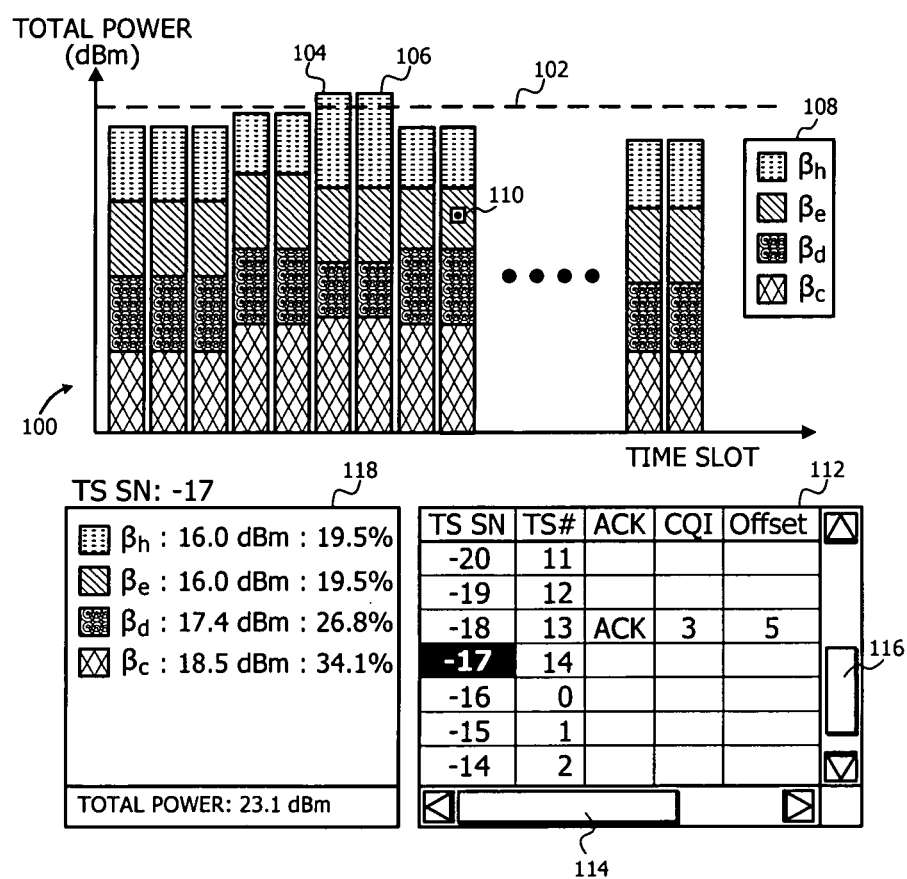
FIG. 4 is an exemplified display of one embodiment according to the present invention.

FIG. 4 is an exemplified display according to the present invention. A stacked bar graph 100 displays a total power to be used for transmitting the communication signals by stacking powers for active channels in each time slot. The horizontal axis represents time, while the vertical represents the total power in dBm. Different channels may be displayed in different colors or different patterns for ease of distinguishing one from another. In the particular example as shown in FIG. 4, four (4) channels are active. A reference line indicated by the dotted line 102 may also be displayed on the stacked bar graph 100. The reference line 102 is, for example, the maximum transmission power permitted by the regulation that is 24 dBm for the W-CDMA (uplink power class 3). Accordingly, it can easily distinguish any time slot that exceeds the maximum transmission power such as the bars 104 and 106. An annotation column 108 is also provided for convenience to show the relationship between the colors and the channels. Moreover, a marker 110 is displayed on the graph 100. The marker 110 can be moved from one position to another on the graph by a user's operation of, for example, a mouse.

Additionally, there is displayed on the screen of the display device 29 a table 112 that indicates parameters of the communication signals in each time slot. In the table 112, the "TS SN" means serial numbers allocated by the signal analyzer to the time slots (TS) and is used for management of the measurement data of the signal analyzer. If there are 100 time slots, the signal analyzer allocates the serial numbers, for example, ranging from −99 to 0. A "TS#" in the table 112 means the time slot number that is proper to each time slot and repeats the numbers between 0-14. The table 112 includes other communication signal parameters. Some examples will be described. An "ACK" is a signal to be sent to a base station when a cellular terminal normally receives the data transmitted thereto. If not received normally, a "NACK" signal is transmitted. A "CQI" is an abbreviation of Channel Quality Indicator and is a parameter relating to the modulation type or the like. An "Offset" is a parameter to indicate the amount of offset of the signal from the head of the time slot. These additional parameters appear once every several time slots. In case when time slots and parameters cannot be included in the table 112, a horizontal slider 114 and a vertical slider 116 may be displayed if desired. The user is able to choose the display range of the parameters in the table 112 by moving the horizontal and vertical sliders 114 and 116 using a mouse.

The display position of the marker 110 and the display range in the table 112 are related to each other. In the particular example as shown in FIG. 4, the marker 110 is displayed at the "−17" bar in the time slot serial number (TS SN) on the graph 100. In response to the position of the marker, the column in the time slot serial number "−17" is displayed in a reverse mode in the table 112. The marker 110 is moved to, for example, a "−12" bar position in the time slot serial number on the graph 100 that is not displayed within the table 112, the display range of the table 112 will be shifted so that the parameter information relating to the time slot serial number "−12" will be displayed and the column of the time slot serial number "−12" will be displayed in a reverse mode. It is of course possible to distinguishably display in a blinking mode or in a different color instead of the reverse mode.

Furthermore, a power level related column 118 is also provided on the screen of the display device 29 for numerically displaying power related values in the time slot corresponding to the position of the marker 110. Since the marker 110 is positioned at the time slot serial number "−17" in the particular example as shown in FIG. 4, the total power and the power level of each channel in dBm at the time position serial number "−17" are displayed in the power related information columns 112. It is also possible to display the percentage of the power for each channel relative to the total power in percentage or dB.

Figure 5:
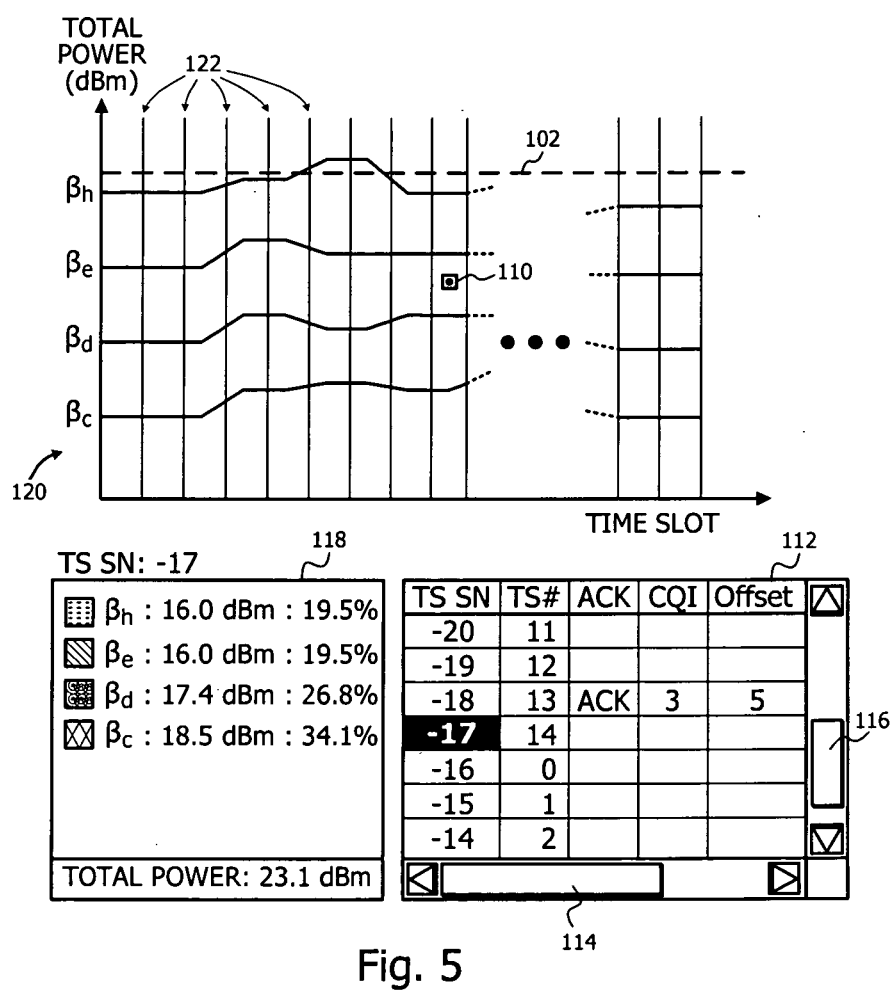
FIG. 5 is an exemplified display of another embodiment according to the present invention.

Now, FIG. 5 is an exemplified display of another embodiment according to the present invention. A description will be made hereunder with the same reference numerals for various elements as those in the embodiment in FIG. 4. A stacked surface graph 120 is employed in the example as shown in FIG. 5 instead of the stacked bar graph 100. The graph is also known as a stacked layer graph. A border between adjacent time slots may be displayed using, for example, a separation line 122. A layer corresponding to each channel is preferable to distinguishably display in a different color or a pattern. Alternatively, it is possible to display only a line (border line) to show the border between adjacent layers. The marker 110 is displayed similarly to the case in FIG. 4 and also displayed are the table 112 and the power related information column 118 that change in synchronism with the marker display position.

Figure 6:
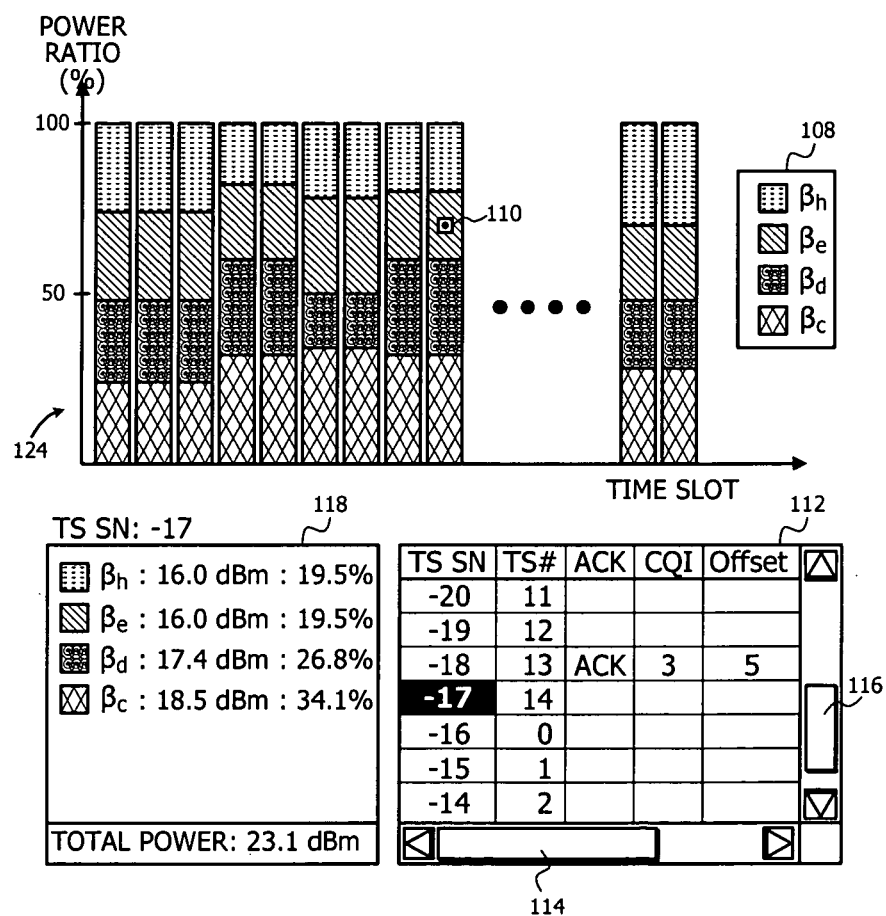
FIG. 6 is an exemplified display of still another embodiment according to the present invention.

Now, FIG. 6 is an exemplified display of still another embodiment according to the present invention. A description will be made hereunder with the same reference numerals for the corresponding elements as those in FIG. 4. In the particular example in FIG. 6, a 100% staked bar graph 124 are employed instead of the stacked bar graph 100. This means that the total power of each time slot is set to be 100% and a power ratio of each channel relative to the total power is displayed, which is considered to be particularly useful in case of placing importance on the time change of the power ratio of each channel. The function of the marker 110 is the same as in FIG. 4.

Although some preferred embodiments of the present invention have been described hereinabove, a person having an ordinary skill in the art will be able to make various modifications without departing from the scope and spirit of the present invention. For example, it is possible to display power in mW in the power related information display column 118. It is also possible to display the code domain power and the codegram display simultaneously with the display of the present invention in such a manner to synchronize with the marker. Although the display range in the table 112 is changed in synchronism with the marker position on the graph in the above examples, it may be reversed. That is, the display range in the graph is changed so as to display the bar corresponding to the time slot that is designated in the table.

What is claimed is:

1. A method of generating a power display of a communication signal for displaying a time change in powers of a plurality of physical channels of the communication signal comprising steps of:
   receiving an input communication signal to be measured having a plurality of physical channels that are transmitted from a cellular terminal and multiplexed by a single carrier dedicated for the uplink;
   calculating power for each active physical channel of the input communication signal for every time slot and a total power of the input communication signal for every time slot;
   generating a display of the total power of the communication signal in a graph by stacking powers of the active physical channels of the uplink in every time slot;
   displaying a marker on the graph; and
   displaying parameter conditions of the communication signal in the time slots in a table, wherein the parameter condition of the communication signal in the time slot corresponding to the marker displayed position on the graph is displayed in the table regardless of the change in the marker displayed position.

2. The method as recited in claim 1 further comprising steps of:
   displaying a marker on the graph; and
   displaying the respective power related values of the active physical channels in the time slot corresponding to the marker displayed position on the graph.

3. The method of claim 1, further comprising performing an inverse-spreading for each physical channel of the plurality of channels to obtain symbol data, wherein the power for each physical active channel and the total power are calculated from the symbol data.

4. A signal analyzer comprising:
   storage means for storing digital data representing a communication signal of a plurality of physical channels that are transmitted from a cellular terminal and multiplexed by a single carrier dedicated for the uplink;
   calculation means for calculating power for each physical channel of the communication signal from the digital data for every time slot and a total power of the input communication signal for every time slot; and
   display means for displaying a graph representing the total power of the communication signal by stacking powers of active physical channels of the uplink in every time slot,
   wherein the display means displays a marker on the graph and parameter conditions of the communication signal in the time slots in a table wherein the parameter condition of the communication signal in the time slot corresponding to the marker displayed position on the graph is displayed in the table regardless of the change in the marker displayed position.

5. The signal analyzer as recited in claim 4 wherein the display means displays a marker on the graph and the respective power related values of the active physical channels in the time slot corresponding to the marker displayed position on the graph.

6. The signal analyzer as recited in claim 4 wherein the calculating means is configured to perform an inverse-spreading for each physical channel of the plurality of channels to obtain symbol data and calculate the power for reach physical active channel and the total power from the symbol data.

* * * * *